United States Patent
Ishikawa et al.

(10) Patent No.: US 10,182,029 B2
(45) Date of Patent: Jan. 15, 2019

(54) ESTIMATION OF INFORMATION DIFFUSION ROUTE ON COMPUTER MEDIATED COMMUNICATION NETWORK

(71) Applicant: INTERNATIONAL BUSINESS MACHINES CORPORATION, Armonk, NY (US)

(72) Inventors: Miki Ishikawa, Kanagawa (JP); Akiko Suzuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 15/047,856

(22) Filed: Feb. 19, 2016

(65) Prior Publication Data

US 2016/0248722 A1    Aug. 25, 2016

(51) Int. Cl.
*H04L 12/58* (2006.01)
*H04L 29/08* (2006.01)

(52) U.S. Cl.
CPC ............ *H04L 51/32* (2013.01); *H04L 67/22* (2013.01); *H04L 51/16* (2013.01); *H04L 67/306* (2013.01)

(58) Field of Classification Search
CPC ......... H04L 51/16; H04L 51/32; H04L 67/22; H04L 67/306
See application file for complete search history.

(56) References Cited

U.S. PATENT DOCUMENTS

| 8,312,056 B1* | 11/2012 | Peng | G06Q 50/01 705/319 |
| 2005/0256949 A1* | 11/2005 | Gruhl | G06F 17/30867 709/223 |
| 2010/0241713 A1* | 9/2010 | Shimizu | G06Q 10/00 709/206 |

(Continued)

FOREIGN PATENT DOCUMENTS

| JP | 2009211211 A | 9/2009 |
| JP | 2012208560 A | 10/2012 |

OTHER PUBLICATIONS

Pei, Sen, "Searching for superspreaders of information in real-world social media", Scientific Reports, Jul. 3, 2014, pp. 1-12, vol. 4—Iss. 5547, Macmillan Publishers Limited., Published Online <http://www.nature.com/articles/srep05547/>.

(Continued)

*Primary Examiner* — Joe Chacko
(74) *Attorney, Agent, or Firm* — Cantor Colburn LLP; Rabin Bhattacharya (57) ABSTRACT

A method for estimation of information diffusion route on computer mediated communication network. The method includes: generating, by a computing device, a user collection that includes an original user posting original information and one or more users forwarding the original information through the communication network; obtaining a network of users registered by a first user of the one or more users forwarding the original information; selecting one or more candidates potentially referred by the first user from (Continued)

the network of the users registered by the first user based on the user collection; and rating the one or more candidates based on historical information of the one or more candidates and the first user. The present invention also provides a computer system and computer program product.

12 Claims, 7 Drawing Sheets

(56) References Cited

U.S. PATENT DOCUMENTS

| | | | | |
|---|---|---|---|---|
| 2012/0259915 A1* | 10/2012 | Bhatt | ............. | G06Q 50/01 709/204 |
| 2014/0114978 A1* | 4/2014 | Chatterjee | ............ | G06Q 10/107 707/739 |
| 2014/0164300 A1* | 6/2014 | Mishra | ................. | G06Q 50/01 706/38 |
| 2014/0280608 A1* | 9/2014 | Hamilton, II | .......... | H04L 51/32 709/206 |
| 2014/0330548 A1* | 11/2014 | Appel | ................. | G06Q 10/101 703/6 |
| 2016/0088105 A1* | 3/2016 | Fan | ....................... | G06O 50/01 709/204 |

OTHER PUBLICATIONS

Xiao, Chunjing, "Predicting User Influence in Social Media", Nov. 2013, Journal of Networks, vol. 8—Iss. 11, Academy Publisher, Published Online <http://ojs.academypublisher.com/index.php/jnw/article/view/jnw081126492655/>.

Enoki, Miki, "Information Diffusion Analysis on Social Media", DIEM Forum 2014, Feb. 14, 2014, B4-6, IBM Tokyo—Research Tokyo, Japan.

* cited by examiner

ESTIMATION OF INFORMATION
DIFFUSION ROUTE ON COMPUTER
MEDIATED COMMUNICATION NETWORK

CROSS-REFERENCE TO RELATED
APPLICATIONS

This application claims priority under 35 U.S.C. § 119 from Japanese Patent Application No. 2015-032078 filed Feb. 20, 2015, the entire contents of which are incorporated herein by reference.

TECHNICAL FIELD OF THE INVENTION

The present invention relates to information analytics. More particularly, the present invention relates to information analytics for a computer mediated communication network.

BACKGROUND OF THE INVENTION

In a computer mediated communication network, which is provided by social networking service such as Twitter™, many messages are posted each day, each second. Some of the messages can be forwarded from one user to another user, repeatedly, causing information diffusion starting from an originator over the communication network. Visualizing diffusion flows of such forwarded messages is important in order to understand a major diffusion route through which information flows easily and to identify an influencer who has significant influence in the network.

However, forwarding mechanisms, e.g. a retweet functionality of Twitter™, can provide typically only information about an original user who has posted a message originally and a forwarding user who has forwarded the message of the original user. The forwarding user may or may not read the original user's message directly, and can read the original message via another user's forwarded message. Information about a user who has posted or forwarded the message that the forwarding user actually read can be lost.

There is a need for efficiently and plausibly estimating an information diffusion route on a computer mediated communication network without requiring direct information of diffusion paths between users.

SUMMARY OF THE INVENTION

The foregoing problems and shortcomings of the prior art are addressed by the present invention, in which there is provided a method, computer system and computer program product for estimating an information diffusion route on a computer mediated communication network.

According to an embodiment of the present invention, there is provided a method for estimating an information diffusion route on a computer mediated communication network. The method includes: generating a user collection that includes an original user and one or more forwarding users. The original user is a user posting original information. The forwarding user is a user forwarding the original information through the communication network. The method further includes: obtaining a network of users registered by a first user of the one or more forwarding users. The method further includes: selecting one or more candidates potentially referred by the first user from the network of the users registered by the first user based on the generated user collection. The method further includes: rating the one or more candidates based on historical information of the one or more candidates and the first user.

According to another embodiment of the present invention, a computer system for estimating an information diffusion route on a computer mediated communication network by executing program instructions tangibly stored in a memory is provided. The computer system including: a processor in communications with the memory, wherein the computer system is configured to: generate a user collection that includes an original user posting original information and one or more users forwarding the original information through the communication network; obtain a network of users registered by a first user of the one or more users forwarding the original information; select one or more candidates potentially referred by the first user from the network of the users registered by the first user based on the user collection; and rate the one or more candidates based on historical information of the one or more candidates and the first user.

The present invention also provides a computer program product for estimating an information diffusion route on a computer mediated communication network. The computer program product including: a computer readable storage medium having program instructions embodied therewith, wherein the computer readable storage medium is a non-transitory signal per se, the program instructions executable by a computer device to cause the computer device to perform a method including: generating a user collection that includes an original user posting original information and one or more users forwarding the original information through the communication network; obtaining a network of users registered by a first user of the one or more users forwarding the original information; selecting one or more candidates potentially referred by the first user from the network of the users registered by the first user based on the user collection; and rating the one or more candidates based on historical information of the one or more candidates and the first user.

BRIEF DESCRIPTION OF THE SEVERAL
VIEWS OF THE DRAWINGS

The present invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE PREFERRED EMBODIMENTS

Now, the present invention will be described using particular embodiments, and the embodiments described hereafter are understood to be only referred as examples and are not intended to limit the scope of the present invention.

One or more embodiments according to the present invention are directed to a method, computer system and computer program product for estimating an information diffusion route on a computer mediated communication network. In such communication network that can be provided by social networking service, many messages are posted each day, each second. Some of the messages can be forwarded from one user to another user. In such a manner, information can diffuse over the network.

However, information that gives exact information flow paths can typically be lost. For examples, in a social networking service such as Twitter™, a forwarded or "retweeted" message retains only information about an original user who has posted the message originally and a forwarding or "retweeting" user who has forwarded or "retweeted" the message. Retweets of retweets do not retain the information about intermediary retweets, but only the original message. Therefore, generating diffusion network based on the forwarded message collection as it stands can provide only a superficial information flow network.

Figure 1A:
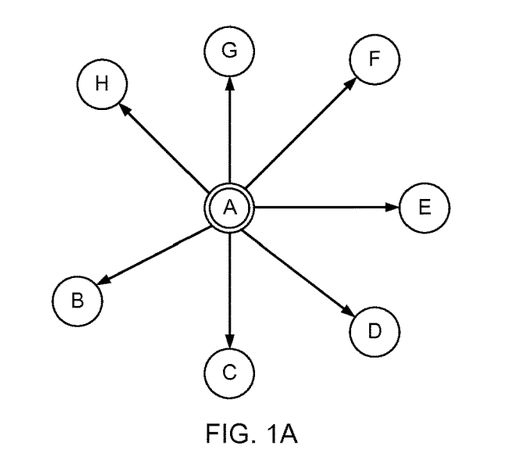
FIG. 1A illustrates a superficial information flow on an exemplary computer mediated communication network.

FIG. 1A illustrates the superficial information flow on the exemplary computer mediated communication network based on the forwarded or "retweeted" message collection. A double circle represents the original user that initially posted the original message and a single circle represents the forwarding or "retweeting" user that has forwarded or "retweeted" the original message of the original user through the communication network.

Figure 1B:
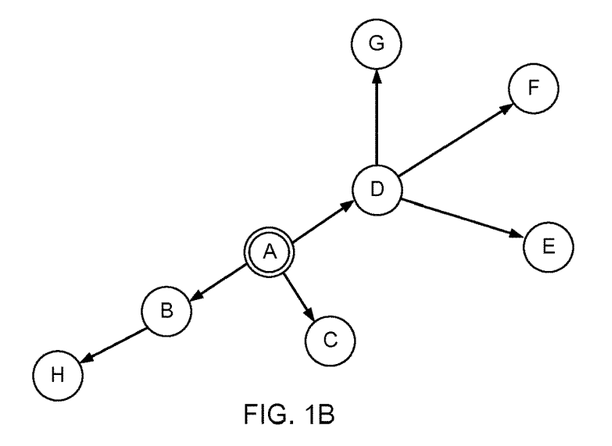
FIG. 1B illustrates an actual information flow on an exemplary computer mediated communication network.

However, the forwarding user can read the original user's message directly, or not read the original message posted by the original user, rather the original message via another user's forwarded message. Thus, exact information flow can differ from that illustrated in FIG. 1A. When the users E, F and G forwarded the original message of the user A in response to having read the message forwarded by the user D, and the user H forwarded the original message of the user A in response to having read the message forwarded by the user B, an actual information flow would be that illustrated in FIG. 1B. FIG. 1B illustrates the actual information flow on the exemplary computer mediated communication network. Unfortunately, information of the user who has posted or forwarded the message that the forwarding user actually read can be lost.

Therefore, there is needed a method and computer system capable of estimating an information diffusion route on the computer mediated communication network based on information that gives only about the original user and the forwarding users, without requiring information that gives exact information flowing paths between the users.

In a particular embodiment according to the present invention, a network of users registered by the forwarding user is utilized to identify one or more candidates potentially referred by the forwarding user. Also, historical information of the forwarding user and the one or more candidates thereof is utilized to rate the one or more candidates.

Figure 1C:
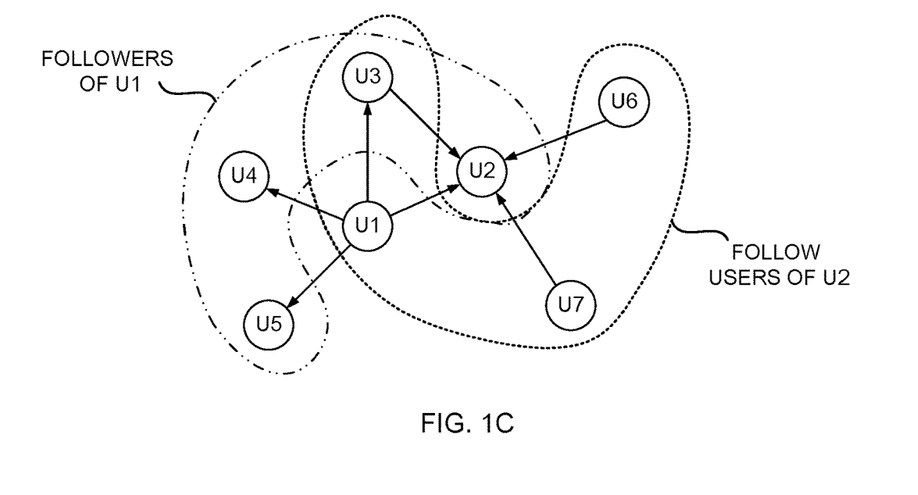
FIG. 1C illustrates a network of users on an exemplary computer mediated communication network.

FIG. 1C illustrates a network of users in an exemplary communication network. An example of the computer mediated communication network is Twitter™, in which the user can issue messages of a limited size to their subscriber or "follower". Each arrow represents a subscribing or "following" relationship between the users, meaning potential information flow path. The messages transmitted through the communication network of Twitter™ are known as "tweets". A "tweet" has a text and can have a hyperlink that a subscriber can select in order to access a website. The user can receive tweets by using a device that can be connectable to the network, such as a laptop, smartphone, tablet computer, etc.

The user participating in the communication network can register specific users to subscribe or "follow" such that the user can receive messages created by the registered users. A user subscribing or "following" a specific user is referred to as a subscriber or "follower" of the specific user. A user that a specific user is subscribing is referred to as a registered user, "follow user" or "friend" of the specific user.

In addition to subscribing, the user can post their own messages. The user can respond or "reply" to the "friend" in response to having read a message from the "friend". The user can also forward or "retweet" the message to their "followers". The message "retweeted" by a certain user becomes viewable by the "followers" of the certain user in their timeline user interface. The "retweeted" message includes a name of the original user and can be typically identified by the format of "RT @username" in tweets.

Referring FIG. 1C, when the user U1 posts a message into the network, then the message posted by user U1 is delivered to the users U2-U5, each of which is a subscriber or "follower" of the user U1. When any one of users U1, U3, U6 and U7, each of which is a registered user or "follow user" of the user U2, posts a message then the message is delivered to the user U2.

In the network shown in FIG. 1C, the user U2 can read and forward the message directly from the user U1 or indirectly from the user U3 who has forwarded or "retweeted" the message of the user U1. In an embodiment of the present invention, the network of the follow users (e.g. U1, U3, U6 and U7 in FIG. 1C) registered by the forwarding user (e.g. U2 in FIG. 1C) and historical information of the users (e.g. U2, U1, U3, U6 and U7 in FIG. 1C) are utilized to identify the most plausible diffusion path through which the forwarding user has received (read and forwarded) the message.

Herein below, the user subscribing the specific user and the user that the specific user is subscribing are generally referred to as the "follower" and the "follow user" in relation to the specific user, respectively, and the user that has posted original message originally and the user that has forwarded the original message are generally referred to as the "original user" and the "retweeting user" in relation to the specific original message, respectively. However, this is not meant as a limitation of the invention, and other communication networks are considered suitable for the methods disclosed herein. Such other communication networks can include, but not limited thereto, networks provided by micro-blogging or blogging services such as Google+™, Facebook™, etc.

Figure 2:
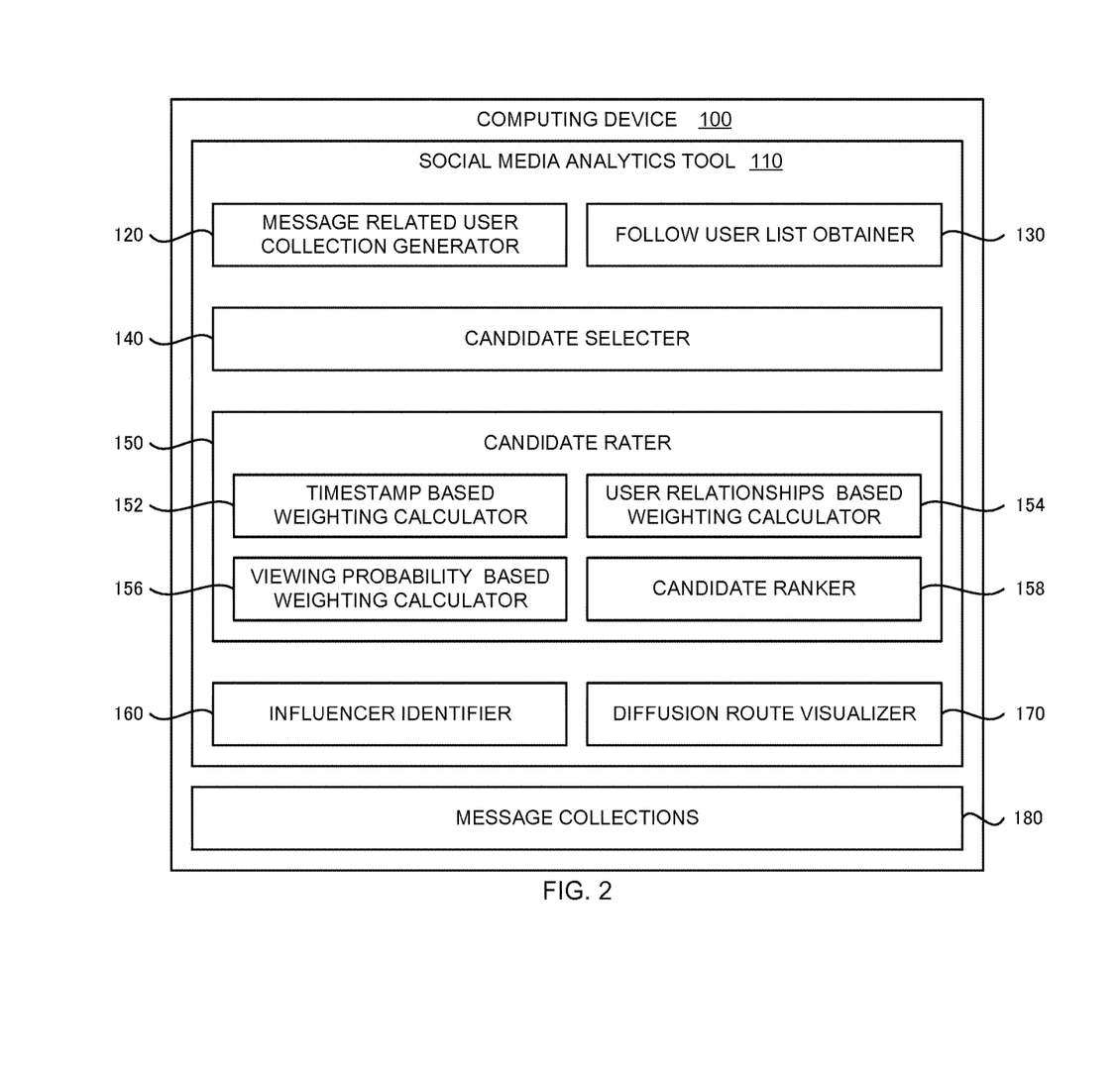
FIG. 2 illustrates a block diagram of a computing device for implementing a social network analytics tool according to an embodiment of the present invention.
Figure 3:
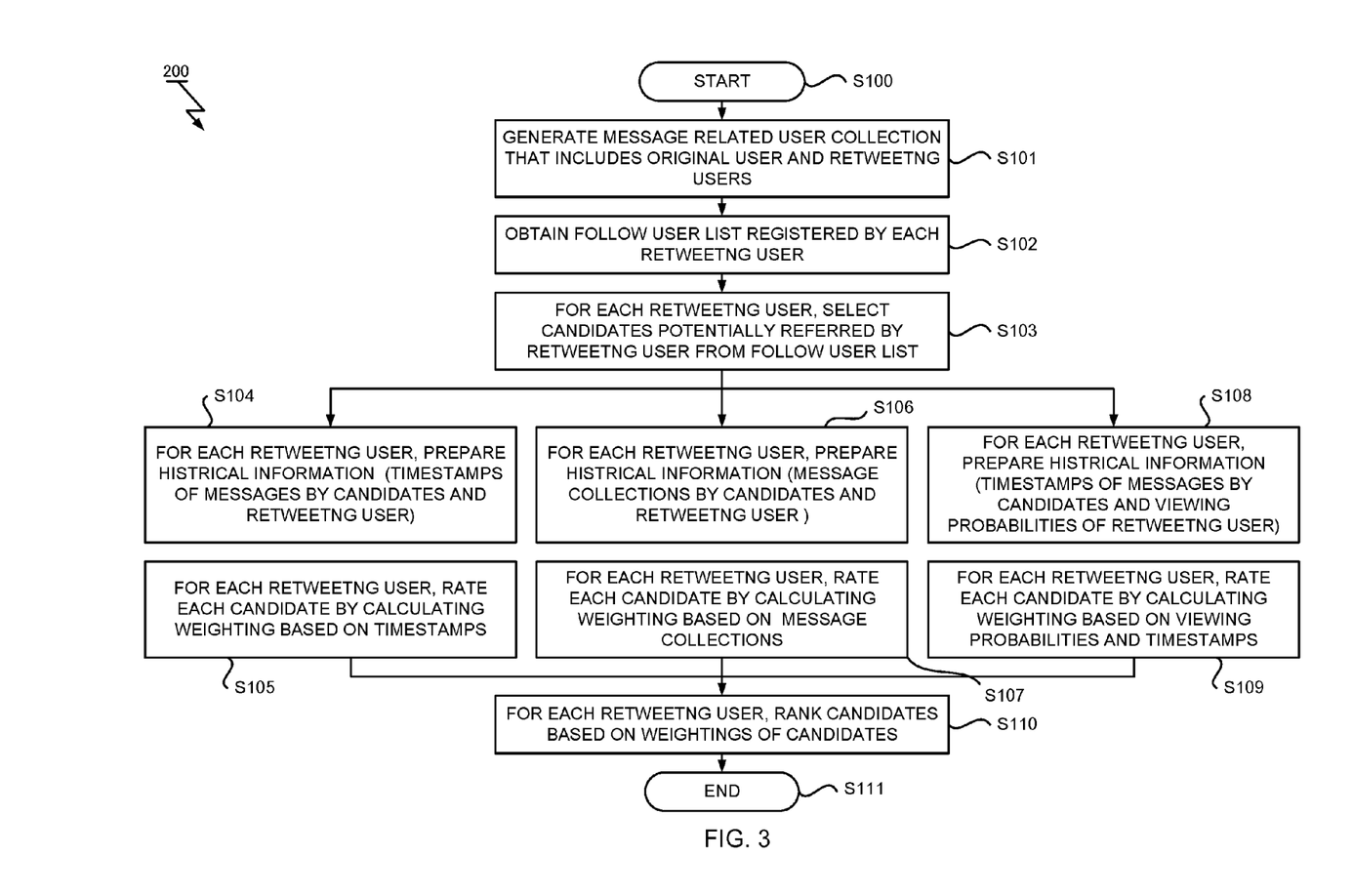
FIG. 3 is a flowchart depicting a process for estimating an information diffusion route according to an embodiment of the present invention.
Figure 4A:
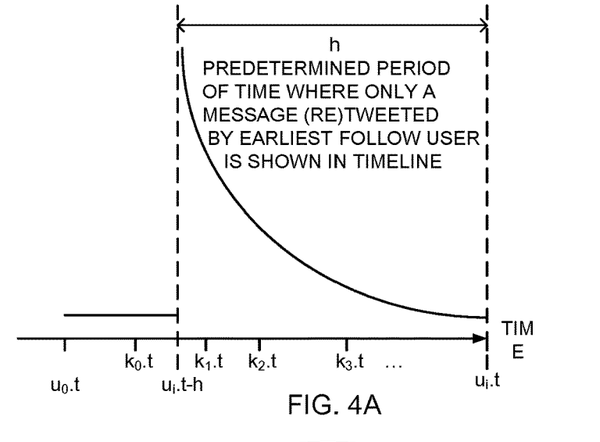
FIG. 4A illustrates an exemplary rating function that reflects information presentation characteristics according to an embodiment of the present invention.
Figure 4B:
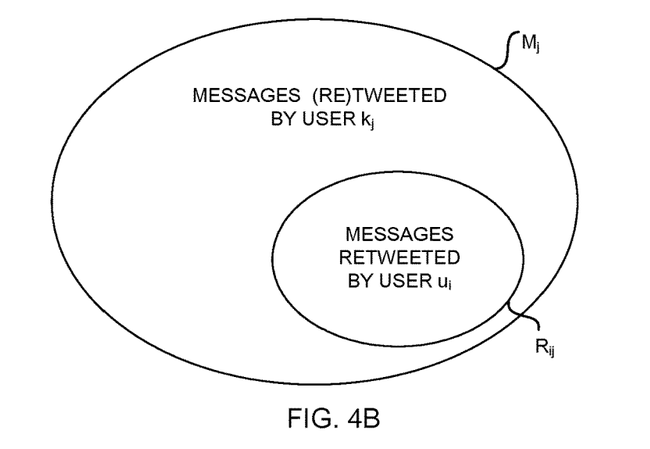
FIG. 4B illustrates user relationships between a candidate and a retweeting user based on a ratio of a message collection by the retweeting user to a message collection by the candidate.
Figure 4C:
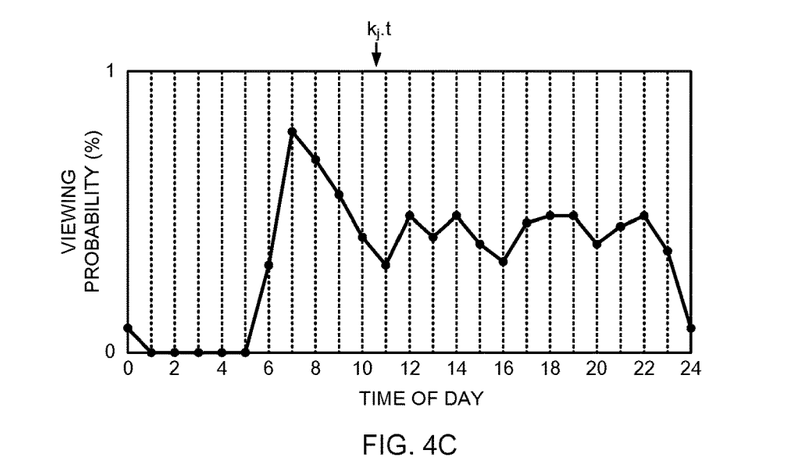
FIG. 4C illustrates viewing probabilities of a retweeting user at each time of day and a timing corresponding to a timestamp by candidate.

Referring now to the series of FIGS. 2-4, there are shown the computer system (as computing device 100) and the method (as process 200) for estimating the information diffusion route on the computer mediated communication network according to one or more embodiments of the present invention.

FIG. 2 illustrates the block diagram of the computing device according to the embodiment of present invention. In FIG. 2, the computing device 100 includes the social media analytics tool 110 for estimating an information diffusion route, and the one or more message collections 180 prepared for analysis.

The message collections 180 include at least a set of messages in relation to an original message of interest. Each message of the collections 180 can include a unique identifier for the message, text, and user who has issued the message and time when the message was created. The retweeted message can further include a representation of the original message that was retweeted. Retweeted messages of retweeted messages do not retain the representations of the intermediary retweeted message, but only the original message. In a particular embodiment, the message collections 180 can be retrieved through an API (Application Programing Interface) provided by the social networking service.

In the described embodiment, the posted or forwarded information is provided in a form of text and/or hyperlink. However, this is not meant as a limitation of the invention, and other forms, for examples images, audios and videos, are considered suitable for the methods disclosed herein.

In another embodiment, the social media analytics tool 110 includes the message related user collection generator 120, the follow user list obtainer 130, the candidate selector 140 and the candidate rater 150.

The message related user collection generator 120 is configured to generate a user collection U that includes an original user $u_0$ and one or more retweeting users $u_i$ (i>0), in relation to the original message of interest, based on the message collections 180. The original user $u_0$ has posted originally the original message and the retweeting user $u_i$ (i>0) has retweeted the original message through the communication network. In an embodiment of the present invention, each user element of the user collection U has a timestamp of the message created by each user, $u_i \cdot t$. The user collection U generated by the user collection generator 120 is referred simply to as the user collection U.

The follow user list obtainer 130 is configured to obtain a network of users registered by each retweeting user $u_i$ (i>0) in the user collection U, in relation to the original message of interest. The network of users retains relationships between the retweeting user $u_i$ and other users registered by the retweeting user $u_i$. In an embodiment of the present invention, the network of users is provided in a form of a follow users list $F_i = \{f_{i1}, f_{i2}, f_{i3}, \ldots\}$; however, this is not meant as a limitation of the invention, and other forms are considered suitable for the methods disclosed herein. In an embodiment of the present invention, the follow user list obtainer 130 can request to the API provided by the social networking service so as to get the follow user list of the specified user by name or id.

The candidate selector 140 is configured to select one or more candidates from the follow user list $F_i$ registered by the retweeting user $u_i$ based on the user collection U, in relation to the original message of interest. Each candidate can be potentially referred by the retweeting user $u_i$. The collection generated by the candidate selector 140 is referred to as the candidate collection $K_i$ for the retweeting user $u_i$. The candidate collection $K_i$ is retrieved from the follow user list $F_i = \{f_{i1}, f_{i2}, f_{i3}, \ldots\}$ where each candidate is a user element of the user collection U (hereinafter, corresponding user element in the user collection U is represented as $u_j$) and has the message posted or retweeted prior to the retweeting user $u_i$ ($u_i \cdot t > u_j \cdot t$).

The candidate rater 150 is configured to rate the one or more candidates $K_i = \{k_0, \ldots, k_n\}$ based on historical information of the one or more candidates $K_i$ and the retweeting user $u_i$, in relation to the original message of interest. In a particular embodiment, the historical information of users can be utilized in order to improve plausibility of the estimation. The candidate rater 150 includes: the timestamp based weighting calculator 152, the user relationships based weighting calculator 154, the viewing probability based weighting calculator 156 and the candidate ranker 158.

The timestamp based weighting calculator 152 is configured to prepare historical information that includes timestamps of the messages created by the retweeting user $u_i$ and candidates $K_i$. The timestamps can be found in the user collection U. The timestamp based weighting calculator 152 is further configured to calculate a weighting for each candidate $k_j$ based on the timestamps by the retweeting user $u_i$ and each candidate $k_j$. The weighting calculated by the timestamp based weighting calculator 152 is referred to as the timestamp based weighting.

The user relationships based weighting calculator 154 is configured to prepare historical information including message collections that can give an insight about relationships between the retweeting user $u_i$ and the candidates $K_i$. The user relationships based weighting calculator 154 is further configured to calculate a weighting for each candidate $k_j$ based on the prepared message collections related to the retweeting user $u_i$ and the candidate $k_j$. The weighting calculated by the user relationships based weighting calculator 154 is referred to as the user relationships based weighting. For example, the user can preferably retweet messages of the specific follow user. The user relationships based weighting reflects such user behaviors.

The viewing probability based weighting calculator 156 is configured to prepare historical information that includes timestamps of messages created by the candidates $K_i$ and viewing probabilities of the retweeting user $u_i$. The viewing probability based weighting calculator 156 is further configured to calculate a weighting for each candidate $k_j$ based on the viewing probability of the retweeting user $u_i$ and timestamp of each candidate $k_j$. The weighting calculated by the viewing probability based weighting calculator 156 is referred to as the viewing probability based weighting. For example, the user can more frequently view the timeline at some specific time of day (e.g. morning, night, 7:00 AM-8:00 AM). The viewing probability based weighting reflects such user behaviors.

As described above, the candidate rater 150 can calculate several weightings for each candidate $k_j$ by using any combination of the weighting calculators 152-156. The candidate ranker 158 is configured to combined these weightings so as to obtain a conclusive weighting for each candidate $k_j$.

In an embodiment of the present invention, the candidate ranker 158 can utilize only the timestamp based, user relationships based or viewing probability based weighting as the conclusive weighting for each candidate $k_j$. In another embodiment, the candidate ranker 158 can combine at least two of the timestamp based, user relationships based and viewing probability based weightings to calculate the conclusive weighting for each candidate $k_j$. Here, combining includes, but is not limited to, averaging, normalizing, scaling, prioritizing or any combination thereof. In the preferable embodiment, the candidate ranker 158 is configured to combine the timestamp based weighting with at least one of the user relationships based and the viewing probability based weightings to calculate the conclusive weighting.

In an embodiment of the present invention, the social media analytics tool 110 can further include an influencer identifier 160 and diffusion route visualizer 170. The influencer identifier 160 is configured to identify an influencer, who has significant influence in the network, based on results of analyzing one or more original messages. The diffusion route visualizer 170 is configured to identify and visualize a major diffusion route, through which information flows easily, based on results of analyzing one or more original messages.

In an embodiment of the present invention, each of unit described in FIG. 2 can be implemented on the computing device 100, where program codes according to an embodiment of the present invention are loaded on a memory and executed by a processor.

FIG. 3 is a flowchart depicting the process 200 for estimating the information diffusion route on the computer mediated communication network. As shown, process 200 begins at step S100. At the beginning, configuration of the social media analytics tool 110 is conducted to specify an original message of interest among the message collections 180. In a particular embodiment, the configuration can include specifying a specific message id, specific topic or specific user to identify the original messages of interest. Note that the process 200 shown in FIG. 3 is performed for each original message of interest. Also, the configuration of the social media analytics tool 110 is conducted to further specify one or more types of weightings for rating the candidate (solely or in combination).

At step S101, the message related user collection generator 120 generates the user collection U that includes the original user $u_0$ and the retweeting users $u_i$ (i>0). Each of users has a timestamp, $u_i \cdot t$. At step S102, the follow user list obtainer 130 obtains the follow users list $F_i = \{f_{i1}, f_{i2}, f_{i3}, \ldots\}$ registered by each retweeting user $u_i$ (i>0) of the user collection U. At step S103, the candidate selector 140 selects, for each retweeting user $u_i$, the one or more candidates potentially referred by the retweeting user $u_i$ from the follow user list $F_i$ of the retweeting user $u_i$.

Steps S104-S110 are performed by the candidate rater 150 shown in FIG. 2. The steps S104 and S105 can be performed by the timestamp based weighting calculator 152. The steps S106 and S107 can be performed by the user relationships based weighting calculator 154. The steps S108 and S109 can be performed by the viewing probability based weighting calculator 156. The step 110 is performed by the candidate ranker 158. The steps actually performed depends on the configuration (specified type(s) of weighting) of the social media analytics tool 110.

At step S104, the timestamp based weighting calculator 152 prepares, for each retweeting user $u_i$, the historical information that includes timestamps of the messages created by the retweeting user $u_i$ and the candidates $K_i$. At step 105, the timestamp based weighting calculator 152 further inputs, for each retweeting user $u_i$, the prepared timestamps into predetermined rating function so as to calculate a timestamp based weighting for each candidate $k_j$ of the candidate collection $K_i$.

In an embodiment of the present invention, the timestamp based weightings $TW_i = \{tw_0, tw_1, tw_2, \ldots, tw_n\}$ for the candidates $K_i = \{k_0, k_1, k_2, \ldots, k_n\}$ are calculated by using a predetermined rating function $f(k_j \cdot t, u_i \cdot t)$ depicted in FIG. 4A. Here, "j" is index of the candidate element in the candidate collection $K_i$. FIG. 4A illustrates the exemplary rating function that reflects information presentation characteristics owing to the user interface provided on the exemplary communication network according to an embodiment of the present invention.

Let us assume that the user $u_i$ has viewed his/her timeline at time $u_i \cdot t$ and retweeted certain message appeared in the timeline. In case of Twitter™, only a message (re)tweeted by the earliest follow user can appear in the timeline of the user $u_i$ within a predetermined period of time h (e.g. 24 hours) from time $u_i \cdot t$. Hence, when the certain message is displayed on the timeline of the user $u_i$, and subsequently other follow users retweet the certain message, repetition can be avoided within the period of time. However, when another follow user of the user $u_i$ retweets the certain message after the period of time, newly retweeted messages can be displayed on the timeline of the user $u_i$.

Thus, the predetermined rating function $f(k_j \cdot t, u_i \cdot t)$ reflects such information presentation characteristics owing to the user interface (e.g. timeline in Twitter™). In an embodiment of the present invention, the predetermined rating function is exponentially (or simply monotonically) decaying as time increases within the period of time ($u_i \cdot t - h < k_j \cdot t = < u_i \cdot t$) and gives a fixed value that is lower than the value at $u_i \cdot t$ before the period of time ($k_j \cdot t = < u_i \cdot t - h$).

As shown in FIG. 4A, the candidate $k_0$ is the earliest follow user who has retweeted the certain message among the follow users of the user $u_i$. However, timestamp $k_0 \cdot t$ is out of the period ($k_0 \cdot t = < u_i \cdot t - h$) and there exist other candidates $k_1, k_2, k_3$ who have also retweeted the same message after candidate $k_0$. In this case, when the user $u_i$ viewed his/her timeline at time $u_i \cdot t$, the second earliest message created by candidate $k_1$ can be displayed and later messages created by candidates $k_2, k_3$ can be avoided. The earliest message by candidate $k_0$ can also be displayed, but can get buried in tweets because of the reverse chronological order organization of the Twitter™ timeline. So the second earliest candidate $k_1$ having higher value is presumed to be more plausible than other follow users $k_0, k_2, k_3$.

The particular example of the rating function illustrated in FIG. 4A is not meant as a limitation of the invention, and other functional forms are considered suitable for the methods disclosed herein. Suitable function form can depend on the particular services such as Twitter™, Google+™, Facebook™, etc.

The steps S104 and S105 are performed when the timestamp based weighting is set to be enabled. When the timestamp based weightings $TW_i$ are used to combine with other type(s) of weighting, the weightings $TW_i = \{tw_0, tw_1, tw_2, \ldots, tw_n\}$ can be normalized so that the sum equals 1.

Now referring back to FIG. 3, at step S106, the user relationships based weighting calculator 154 performs, for each retweeting user $u_i$, to prepare historical information that includes message collections of the retweeting user $u_i$ and the candidates $K_i$. At step 107, the user relationships based weighting calculator 154 further calculates, for each retweeting user $u_i$, a user relationships based weighting for each candidate $k_j$ of the candidate collection $K_i$.

In an embodiment of the present invention, the user relationship based weightings $UW_i = \{uw_0, uw_1, uw_2, \ldots, uw_n\}$ for the candidates $K_i = \{k_0, k_1, k_2, \ldots, k_n\}$ are calculated based on prepared message collections. FIG. 4B illustrates user relationships between the candidate $k_j$ and the retweeting user $u_i$ based on a ratio of a message collection $R_{ij}$ by the retweeting user $u_i$ to a message collection $M_j$ by the candidate $k_j$.

At first, the user relationships based weighting calculator 154 retrieves messages (re)tweeted by the candidate $k_j$ from the message collections 180 to form the message collection $M_j$. In an embodiment of the present invention, the message collection $M_j$ can include messages created by candidate $k_j$ within predetermined period (e.g. x months, x days). In another embodiment, the message collection $M_j$ can include a predetermined number of most recent messages created by candidate $k_j$ (e.g. most recent x messages). Then, the user relationships based weighting calculator 154 retrieves messages retweeted by the retweeting user $u_i$ among the message collection $M_j$ to form the message collection Finally, the user relationships based weighting calculator 154 performs to calculate the ratio of the message collection $R_{ij}$ to the message collection $M_j$ as the user relationship based weighting $uw_j$ for candidate $k_j$.

The particular example illustrated in FIG. 4B is not intended to limit the invention. Other message collections are considered suitable for the methods disclosed herein. In other embodiments, for example, a ratio of message registered by the retweeting user $u_i$ as favorites among the message collection $M_j$ can be utilized.

The steps S106 and S107 are performed when the user relationships based weighting is set to be enabled. When the user relationships based weightings $UW_i$ are used to combine with other type(s) of weighting, the weightings $UW_i = \{uw_0, uw_1, uw_2, \ldots, uw_n\}$ can be normalized so that sum equals 1.

Now referring back to FIG. 3, at step S108, the viewing probability based weighting calculator 156 prepares, for each retweeting user $u_i$, historical information that includes a timestamp by the candidate $k_j$ and viewing probabilities of the retweeting user $u_i$. At step 109, the viewing probability based weighting calculator 156 further calculates, for each retweeting user $u_i$, a viewing probability based weighting $vw_j$ for each candidate $k_j$ of the candidate collection $K_i$.

In an embodiment of the present invention, the viewing probability based weightings $VW_i = \{vw_0, vw_1, vw_2, \ldots, vw_n\}$ for the candidates $K_i = \{k_0, k_1, k_2, \ldots, k_n\}$ are calculated based on timestamp by candidate $k_j$ and viewing probability of the retweeting user $u_i$ corresponding to the timing $k_j \cdot t$ as illustrated in FIG. 4C.

FIG. 4C illustrates viewing probabilities of retweeting user $u_i$ at each time of day and a timing corresponding to a timestamp of candidate, $k_j \cdot t$. As shown in FIG. 4C, viewing probabilities at every hour of day for user $u_i$ are provided. In an embodiment of the present invention, the viewing probability at the hour of day corresponding to the timing of timestamp $k_j \cdot t$ can be directly used as the viewing probability based weighting $vw_j$.

In an embodiment of the present invention, the viewing probability can be calculated from logged user's behaviors. Statistical information calculated based on the message collections 180 can give an insight about user's behavior of the past. In another embodiment, a histogram of tweet distribution by time of day can be used to estimate the viewing probabilities of the user at each time of day.

In another embodiment, delay in responding to a message that is "mentioned" to the user (i.e. tweet with specific "@username") can be used to estimate the viewing probabilities of the user at each time of day. For instance, when a user has responded to a message several hours later after the message was mentioned by his/her friend, it is considered that the user has not viewed the timeline for that time.

The steps S108 and S109 are performed when the user relationships based weighting is set to be enabled. When the viewing probability based weightings $VW_i$ are used to combine with other type(s) of weighting, the weightings $VW_i = \{vw_0, vw_1, vw_2, \ldots, vw_n\}$ can be normalized so that sum equals 1.

Now referring back to FIG. 3, at step S110, the candidate ranker 158 calculates, for each retweeting user $u_i$, the conclusive weighting by solely using the specified type of weighting or by combining specified types of weighting for each candidate $k_j$. The weighting(s) actually used can depend on the configuration of the social media analytics tool 110. In a particular embodiment, the candidate ranker 158 performs to calculate an average of the timestamp based weighting $tw_j$, the user relationships based weighting $uw_j$ and the viewing probability based weighting $vw_j$ to obtain the conclusive weighting $w_j$ for each candidate $k_j$. Finally, the process 200 ends at step S111.

Information path from the candidate $k_j^*$ with highest weighting is most plausible path to the retweeting user $u_i$. Accordingly, by the process 200 shown in FIG. 3, it is possible to identify a most plausible diffusion route through which the original message has flowed. For example, it is capable of identifying a user who is retweeted by other users more than the users retweeting the original user's tweet directly. Such user can be a curator user who collects, organizes and displays information relevant to a specific topic of interest on the communication network.

In an embodiment of the present invention, the influencer identifier 160 identifies an influencer who has significant influence in the network based on results of analyzing one or more original messages.

At first, the influencer identifier 160 prepares a collection of original messages relevant to a specified topic so as to subject each original message to the process 200 shown in FIG. 3. Upon obtaining results of all prepared original messages, the influencer identifier 160 constructs an information diffusion network. The information diffusion network can include a plurality of users as a node, as well as a plurality of relationships between the users as edges, each being involved in the collection of the original message. Each node can have one or more weightings, each of which is calculated by the process 200 in relation to certain original message of interest. The influencer identifier 160 further calculates an average weighting for each node based on the one or more weightings. Finally, the influencer identifier 160 identifies one or more users having higher average weighting as influencers based on the information diffusion network.

In an embodiment of the present invention, the diffusion route visualizer 170 identifies one or more major diffusion routes through which information flows easily based on results of analyzing one or more original messages.

At first, the diffusion route visualizer 170 prepares a collection of original messages relevant to a specified topic or a specified user so as to subject each original message to the process 200 shown in FIG. 3. Upon obtaining results of all original messages, the diffusion route visualizer 170 constructs an information diffusion network where involved users are nodes and relationships between the users are edges. Each node can have one or more weightings, each of which is calculated by the process 200 in relation to a certain original message of interest. Then, the diffusion route visualizer 170 calculates an average weighting for each node. The diffusion route visualizer 170 performs further to extract one or more nodes having higher average weighting than the predetermined threshold. Finally, the diffusion route visualizer 170 identifies and visualizes a route including the extracted nodes and the edges connected between the extracted nodes in chain as a major information diffusion route, based on the information diffusion network.

Experimental Studies

Experiments were conducted by using a tweet dataset acquired from the Twitter™ API, each tweet created at the period of 2013 Jul. 30-2013 Jul. 31. Among the tweets in the dataset, certain original tweet created at "2013 Jul. 30 AM 9:57" with 554 retweeted users and retweets thereof were selected to prepare a message collection for analysis.

A program implemented the process 200 shown in FIG. 3 (using only timestamp based weighting) was coded and executed for the prepared message collection. As a comparative example, a program implemented a process, where the earliest follow user is presumed to be the most plausible user, was coded and executed for the same message collection.

By comparison with the result of the comparative example, by the example program according to the present invention, 41 retweeting users were corrected, improving estimation accuracy by approximately 7.5%.

Cloud Environment Implementation

It is understood in advance that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 5:
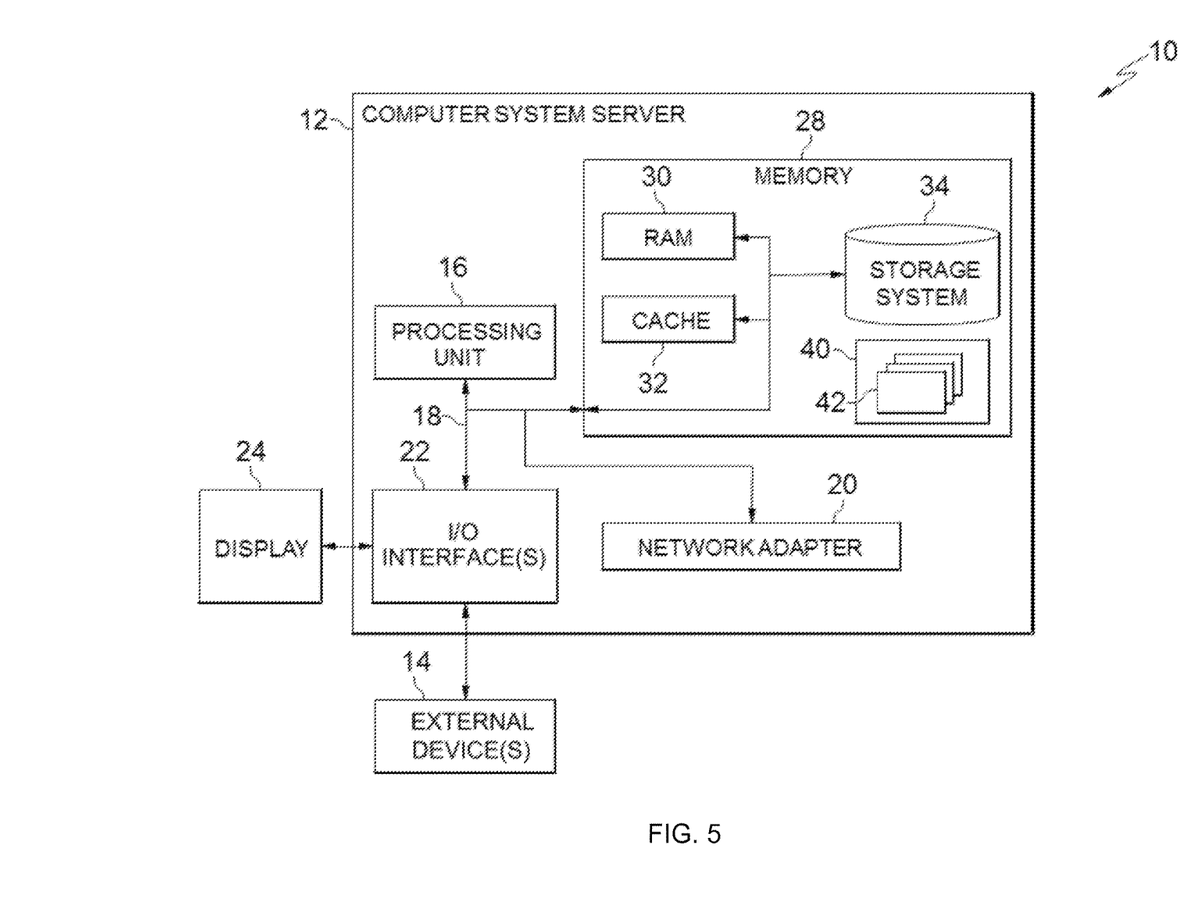
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 5, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
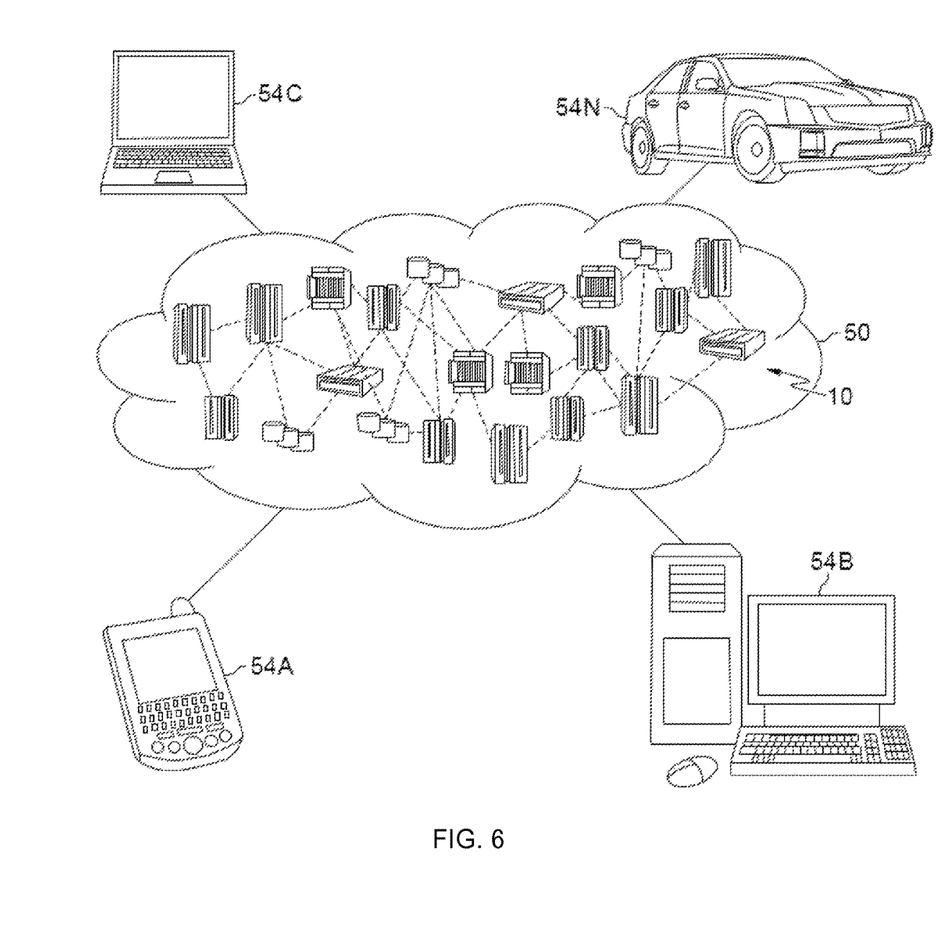
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
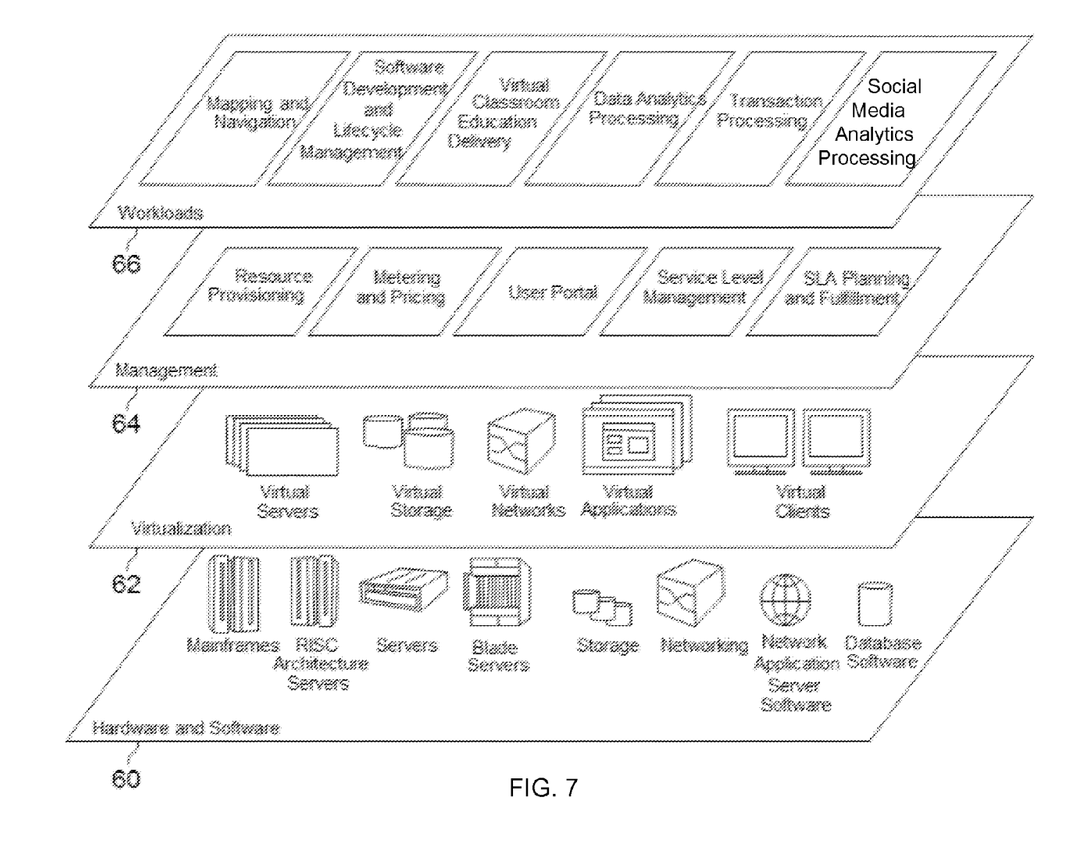
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing; and social media analytics processing.

In a particular embodiments, there is provided a computer program product or software that implements the social media analytics processing in accordance with embodiments described herein, as a service in a cloud environment. In particular embodiments, the computing device 100 has same architecture as that of the computing node 10.

Computer Program Implementation

The present invention can be a computer system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for estimating an information diffusion route on a computer mediated communication network, the method comprising:
    generating, by a computing device, a user collection that includes an original user posting original information and one or more users forwarding the original information through the communication network;
    obtaining a network of users registered by a first user of the one or more users forwarding the original information;
    selecting one or more candidates potentially referred by the first user from the network of the users registered by the first user based on the user collection; and
    rating the one or more candidates based on historical information of the one or more candidates and the first user,
    wherein the historical information includes a first collection of messages each posted or forwarded by each candidate and a second collection of messages each forwarded by the first user among the first collection, and the rating includes calculating a weighting for each candidate based on a ratio of the second collection to the first collection for each candidate.

2. The method of claim 1, wherein the historical information includes a timestamp of the original information forwarded by the first user and a timestamp of the original information posted or forwarded by each candidate, and the rating comprises:
    calculating a weighting for each candidate based on the timestamp by the first user and the timestamp by each candidate.

3. The method of claim 1, wherein the historical information includes a timestamp of the original information posted or forwarded by each candidate and a probability of viewing by the first user at time of day corresponding to the timestamp by each candidate, and the rating comprises:
    calculating a weighting for each candidate based on the probability at the time of day corresponding to the timestamp by each candidates.

4. The method of claim 2, wherein the weighting for each candidate is calculated based on a function reflecting an information presentation characteristic owing to a user interface provided on the communication network, and a candidate having higher weighting is presumed to be more plausible than other candidates having lower weighting.

5. The method of claim 2, wherein the historical information further includes a first collection of messages each posted or forwarded by each candidate and a second collection of messages each forwarded by the first user among the first collection, a probability of viewing by the first user at a time of day corresponding to the timestamp by each candidate, or any combination thereof, the rating comprising:
    calculating further at least one weighting for each candidate based on a ratio of the second collection to the first collection by each candidate, the probability at the time of day corresponding to the timestamp by each candidates, or any combination thereof; and
    combining the calculated weightings to obtain a conclusive weighting for each candidate.

6. The method of claim 1, wherein the selecting comprises:
    selecting a candidate user from the network of the users registered by the first user, the candidate user being contained in the user collection and having the original information posted or forwarded prior to the first user.

7. The method of claim 1, further comprising:
    preparing a collection of information relevant to a specified topic;
    constructing an information diffusion network comprising a plurality of users as nodes, the plurality of users being involved in the collection of information;
    calculating an average weighting for each node based on the collection of the information; and identifying an influencer based on the information diffusion network having the average weighting for each node.

8. The method of claim 1, further comprising:
preparing a collection of information relevant to a specified topic or a specified user;
constructing an information diffusion network comprising a plurality of users as nodes, the plurality of users being involved in the collection of information;
calculating an average weighting for each node based on the collection of the information;
extracting one or more nodes having higher average weighting than a predetermined threshold; and
identifying an information diffusion route comprising the extracted nodes and the edges connected between the extracted nodes in chain, based on the information diffusion network.

9. The method of claim 1, wherein the communication network is provided by micro-blogging service or blogging service, and the original information is delivered to subscriber by the micro-blogging service.

10. A computer system for estimating an information diffusion route on a computer mediated communication network by executing program instructions tangibly stored in a memory, the computer system comprising:
a processor in communications with the memory, wherein the computer system is configured to:
generate a user collection that includes an original user posting original information and one or more users forwarding the original information through the communication network;
obtain a network of users registered by a first user of the one or more users forwarding the original information;
select one or more candidates potentially referred by the first user from the network of the users registered by the first user based on the user collection; and
rate the one or more candidates based on historical information of the one or more candidates and the first user,
wherein the historical information includes a timestamp of the original information forwarded by the first user and a timestamp of the original information posted or forwarded by each candidate, and the computer system is further configured to:
calculate a weighting for each candidate based on the timestamp by the first user and the timestamp by each candidate.

11. The computer system of claim 10, wherein the historical information includes a first collection of messages each posted or forwarded by each candidate and a second collection of messages each forwarded by the first user among the first collection for each candidate, and the computer system is further configured to:
calculate a weighting for each candidate based on a ratio of the second collection to the first collection.

12. The computer system of claim 10, wherein the historical information includes a timestamp of the original information posted or forwarded by each candidate and a probability of viewing by the first user at a time of day corresponding to the timestamp by each candidate, and the computer system is further configured to:
calculate a weighting for each candidate based on the probability at the time of day corresponding to the timestamp by each candidates.

* * * * *